United States Patent Office 3,225,619
Patented Dec. 28, 1965

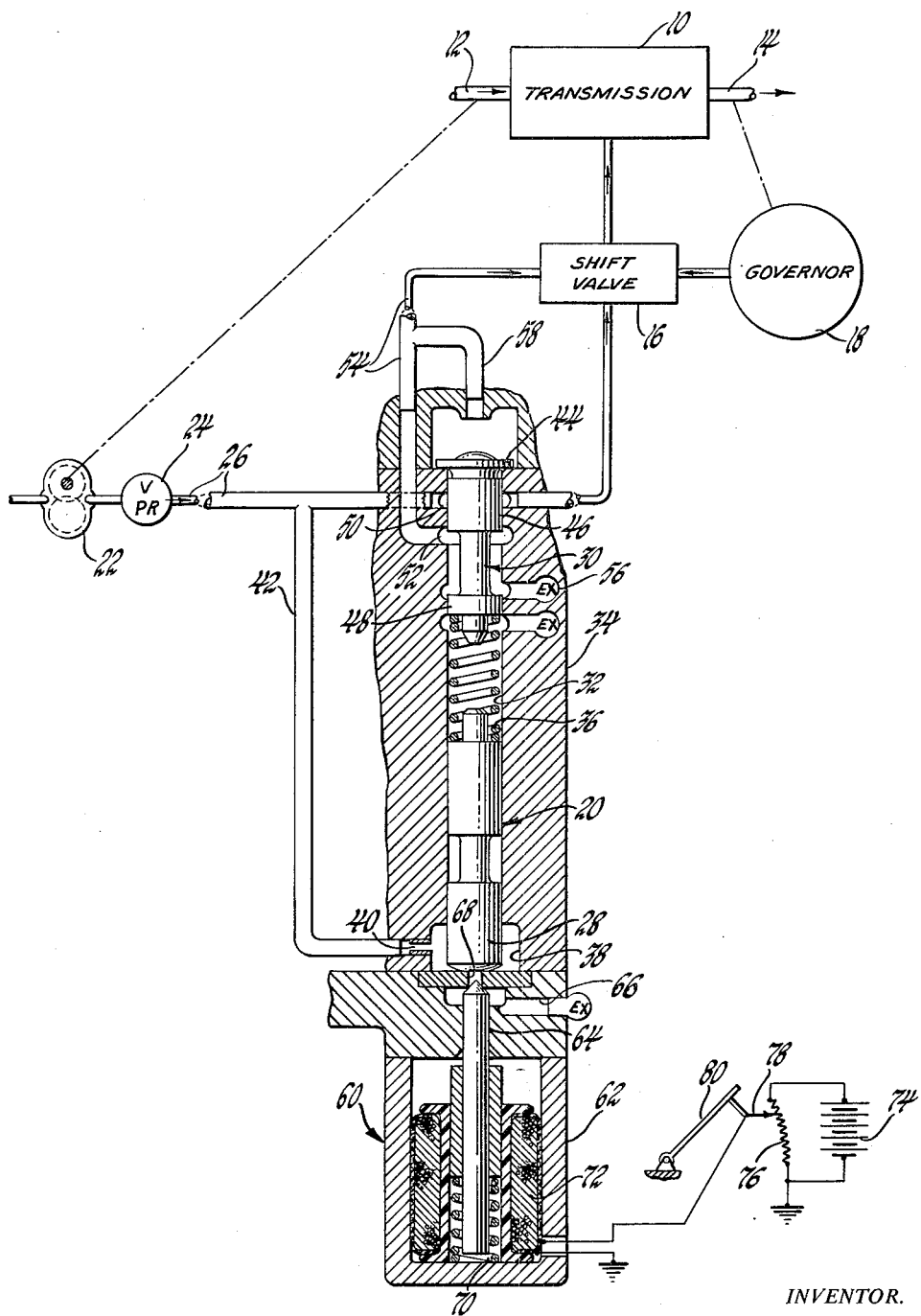

3,225,619
TRANSMISSION CONTROL SYSTEM
Robert H. Schaefer, Westfield, Ind., assignor to General Motors Corporation, Detroit, Mich., a corporation of Delaware
Filed Dec. 3, 1962, Ser. No. 241,900
7 Claims. (Cl. 74—472)

This invention relates to improvements in control systems adapted for use, although not exclusively, with motor vehicle transmissions.

In automatic transmissions of the plural ratio type, shifts take place at certain points determined by vehicle speed and driver demand. Hence, if the driver requires acceleration, a shift point will occur later than when this acceleration is not needed. One way of indicating driver demand is to utilized a linkage for interconnecting the accelerator pedal and a pressure regulating valve. The position of the accelerator pedal then is sensed by the pressure regulating valve and a regulated pressure is developed reflecting this position. In a way well known to those versed in the art, this regulated pressure is utilized in the transmission control system for altering shift points, e.g., by opposing upshifting movements of a shift valve. As can be appreciated, the alignment of this linkage must be maintained accurately, for otherwise the shift points can vary appreciably and impair optimum transmission performance. Because of this tendency for any mechanical linkage to become misaligned due to wear, abuse, or for other reasons, it is proposed to provide a new and different way for transferring these driver demands to the transmission. Specifically, it is proposed to utilize a unique electro-hydraulic arrangement whereby driver demands are converted first to an electrical effect, and thereafter to a corresponding fluid pressure.

It is the further objective of the invention to provide a novel way for electrically controlling a fluid pressure regulator.

The foregoing and other objects and advantages of the invention will be apparent from the following description and the accompanying drawing in which the single figure shows schematically a transmission control system incorporating the principles of the invention.

Considering now the details of the control system, the numeral 10 denotes generally a transmission having an input shaft 12 and an output shaft 14 connected in any known way respectively to the engine and the wheels of the vehicle. The transmission 10 is of the character that automatically changes from one drive ratio to another in accordance with the position of a suitable shift valve 16. The shift valve 16 is urged in the upshifting direction by an appropriate governor 18 that is driven at a speed proportional to that of the output shaft 14, and in the downshift direction by a pressure fluid reflecting driver demand or torque demand on the engine. In the event that the torque demand is great, the shift point will take place at a higher vehicle speed than when the demand is slight. The transmission 10, the shift valve 16, and the governor 18 may be of any known form, e.g., similar to that disclosed in the Sand Patent 3,004,447.

This pressure reflecting driver or torque demand is developed by a pressure regulating valve train, which hereinafter will be identified as a throttle regulator valve train 20. Fluid under pressure is derived from a suitable pump 22 driven by the input shaft 12. If required, any appropriate pressure regulating valve 24 may be employed for controlling the pressure of the fluid from the pump 22. This pressure fluid is delivered to the throttle regulator valve train 20 by a line 26 where it is converted to a fluid pressure reflecting torque demand as will become apparent.

The throttle regulator valve train 20 comprises a throttle valve element 28 and a throttle regulator valve element 30. Both are axially aligned within a bore 32 in a valve body 34. A compression spring 36 is interposed between the two valve elements 28 and 30 and acts to separate these two valve elements. The valve train 20 also includes a control chamber 38 arranged at the lower end of the throttle valve element 28. This control chamber 38 communicates with the line 26 through an orifice 40 and a branch 42. The orifice 40 prevents the pressure in the branch 42 from being perceptibly influenced at those times when the control chamber 38 is opened to an exhaust in a way to be explained.

The throttle regulator valve element 30 has spaced lands 44, 46, and 48. The land 46 controls the opening of inlet and outlet ports 50 and 52 communicating respectively with the line 26 and a supply line 54 extending to the shift valve 16. The land 48 controls the opening of an exhaust port 56.

If the pressure within the control chamber 38 is zero, the throttle regulator valve element 30 will develop a minimum pressure determined by the bias from the spring 36. In developing this minimum pressure, the valve element 30 will in a known way initially open the inlet port 50 and cause this fluid to be delivered to the outlet port 52. Pressure fluid in the supply line 54 is transferred by a branch 58 to the upper area of the valve element 30 and will cause the valve element 30 to move downwardly to a positon in which the exhaust port 56 is opened and the inlet port 50 is closed. Thereafter, the regulator valve element 30 will move between these two extreme positions with the usual regulating action and develop the minimum regulated pressure. The maximum regulated pressure is produced when the pressure in the control chamber 38 corresponds to that in the line 26. At this time, the force tending to open the regulating valve element 30 is greatest.

To vary the pressure developed by the throttle regulator valve element 30 between the minimum and maximum extremes described and in accordance with driver demand, a control valve denoted generally by the numeral 60 is employed. This control valve 60 includes a housing 62 in which is slidably positioned an elongated exhaust valve element 64. The exhaust valve element 64 controls the communication between the control chamber 38 and an exhaust port 66 via an exhaust opening 68. The exhaust valve element 64 is urged to the closed position by a spring 70 and urged to the open position by a magnetic force derived from a solenoid winding 72. The solenoid winding 72 is arranged within the housing 62 as displayed so that the flux lines have the appropriate path for developing this valve element opening magnetic force when the solenoid winding is energized. The exhaust valve element 64 serves as an armature and in actual practice has approximately a total of five-thousandths of an inch movement between the fully open and closed position.

The solenoid winding 72 is energized by a D.C. source such as a vehicle battery 74. A variable impedance, e.g., a potentiometer 76, is connected across the battery 74 and has an adjustable tap 78 extending to the solenoid winding 72. Consequently, the position of the adjustable tap 78 determines the proportion of the battery voltage applied to the solenoid winding 72. The adjustable tap 78 is preferably moved by an accelerator pedal 80, which controls the conventional engine throttle (not shown). However, other provisions may be made for this movement; for instance, a direct connection with the throttle linkage or by the use of intake manifold pressure. Either can be accomplished in any appropriate way so as to reflect driver demand on the engine.

In operation, when the accelerator pedal 80 is depressed such that the throttle opening is increased to reflect an increased torque demand, the adjustable potentiometer tap 78 it moved towards ground. As a result, the proportion of battery voltage applied to the solenoid winding 72 is decreased. A decrease in the applied voltage will reduce the magnetic force acting on the exhaust valve element 64 and the exhaust valve element 64 will correspondingly reduce the communication between the exhaust opening 68 to the control chamber 38 and the exhaust port 66. The pressure within the control chamber 38 will correspondingly increase and increase the force acting to urge the throttle valve element 28 upwardly. As mentioned, this increased force will cause the throttle regulator valve 30 to respond and develop a greater regulated pressure in the supply line 54.

Therefore, any increase in the throttle opening will cause the control valve 60 to increase the pressure in the control chamber 38 a corresponding amount. The throttle regulator valve train 20 will increase its regulating point and a correspondingly increased regulated pressure will be developed in the supply line 54 to the shift valve 16. The governor 18 now will have to develop a greater opposing force before the shift valve 16 can move to its upshifted position; by way of example and without limitation, the shift point may be increased from 30 m.p.h. to 35 m.p.h.

Of course, when the applied voltage increases as when the accelerator pedal 80 is moved towards the closed throttle position and the tap 78 moves away from ground, the control valve 60 will decrease the pressure of the fluid in the control chamber 38. Now the throttle regulator valve train 20 will develop a proportionally reduced regulated pressure in the supply line 54.

It should be noted that in some instances the throttle valve element 28 may be omitted and the pressure fluid within the control chamber 38 caused to act directly on the lower end of the throttle regulator valve element 30 along with the spring 36. Other modifications can be made without deviating from the spirit of the invention as will be apparent to those versed in the art.

From the foregoing, it will be appreciated that driver demand is converted to a voltage. This voltage is used to operate a control valve 60, which in turn controls a pressure acting on the regulating valve train 20. There is no concern for wear or misalignment of a mechanical linkage. The regulating valve train 20 will operate as long as there is a voltage available; or, in other words, at all times when the vehicle is operating and consequently is, in effect, "fail-safe."

The invention is to belimited only by the following claims:

1. In a transmission control system for an engine driven vehicle, the combination of a pressure fluid responsive device for controlling the transmission, a source of pressure fluid for the device, means regulating the fluid pressure supplied to the device, electrically operated means for controlling the pressure regulating means, the electrically operated means including a source of electrical energy and a manually operated control for varying the electrical energy in accordance with engine torque demand so as to cause the pressure at which the pressure regulating means regulates to correspondingly vary.

2. In a transmission control system for a vehicle; a pressure fluid responsive device for controlling the transmission, a source of pressure fluid for the device, means regulating the fluid pressure supplied to the device, means developing a variable pressure for controlling the pressure regulating means, the variable pressure developing means including electrically operated control valve means for altering the variable pressure, a source of electrical energy for operating the control valve means, and a manually operated controller for varying the amount of electrical energy supplied to the control valve means in accordance with a condition of vehicle operation so as to vary the pressure and accordingly the pressure at which the pressure regulating means regulates.

3. In a transmission control system for an engine driven vehicle; the combination of a pressure fluid responsive device for controlling the transmission; a source of pressure fluid for the device; means regulating the fluid pressure supplied by the source to the device; and means developing a variable pressure for controlling the pressure regulating means; the variable pressure developing means including a control chamber communicating with the source, an electrically operated control valve for varying the pressure in the control chamber, a source of electrical energy, and means varying the amount of electrical energy supplied to the control valve in accordance with torque demand on the engine and accordingly the pressure in the control chamber so that the pressure regulating means will develop a regulated pressure reflecting torque demand.

4. In a control system for an engine driven transmission; the combination of a fluid responsive device for controlling the transmission; a source of pressure fluid; means regulating the fluid pressure supplied to the device including a regulating valve element; and means developing a variable pressure for acting on the valve element so as to control the pressure developed by the pressure regulating means; the variable pressure developing means including a control chamber adjacent the valve element and communicating with the source of pressure fluid, an electrically operated control valve for controlling the exhaust of the fluid from the control chamber and accordingly the pressure within the control chamber, a voltage source for operating the control valve, and an engine controlling member for varying the voltage supplied to the control valve so as to vary the pressure in the control chamber and accordingly the pressure at which the regulating means regulates.

5. In a control system for an engine driven transmission; the combination of a pressure fluid responsive device for controlling the transmission; a source of pressure fluid for the device; and pressure regulating valve means for varying the fluid pressure supplied by the source to the device in accordance with torque demand on the engine; the pressure regulating valve means including a valve element and a control chamber adjacent the valve element, the control chamber communicating with the pressure fluid source and having an exhaust opening therefrom, an exhaust valve for controlling the exhaust opening and accordingly the pressure in the control chamber, a voltage source operatively connected to the exhaust valve so as to maneuver the exhaust valve, a manual control member for varying the torque demand on the engine, and a variable impedance adjustable by the manual control member so as to vary the voltage applied to the exhaust valve in accordance with the adjustment of the variable impedance and thereby alter the pressure in the control chamber so that the pressure regulating valve means will develop a regulated pressure that reflects torque demand on the engine.

6. In combination; a valve body having a bore therein and including spaced inlet, outlet and relief passages opening into the bore; a source of fluid pressure communicating with the inlet passage; a regulating valve slidably positioned within the bore and movable between the inlet and relief passages to regulate the pressure of the fluid in the outlet passage within predetermined minimum and maximum limits, the regulator valve having one face thereof exposed to the pressure fluid in the outlet passage so as to urge the regulator valve in a pressure decreasing direction, biasing means urging the regulator valve in a pressure increasing direction; and control means including a control chamber communicating both with the inlet passage and the bore so that the pressure of the fluid therein will act upon the regulator valve and cooperate with the biasing means to urge the regulator valve in the pressure increasing direction, the control chamber having an exhaust therefrom, a control valve coacting with the exhaust to vary the opening thereof and accordingly the exhaust of fluid from the control chamber so as to alter the fluid pressure within the control chamber, electromagnetic means for operating the control valve, the electromagnetic means including a relay winding so arranged relative to the control valve as to apply an electromagnetic force thereto when energized for causing the control valve to alter the opening of the exhaust, a voltage source for energizing the relay winding, and manually variable impedance means for varying the amount of voltage applied to the relay winding and accordingly the energization thereof so that the fluid pressure in the control chamber is varied in accordance therewith thereby causing the regulator valve to maintain the pressure of the fluid in the outlet passage within the predetermined minimum and maximum limits.

7. In a control system for an engine driven transmission; the combination of a pressure fluid responsive device for controlling the transmission; a source of pressure fluid for the transmission, a valve body having a bore therein and including spaced inlet, outlet and relief passages opening into the bore; the inlet and outlet passages communicating respectively with the source and the device; a regulating valve slidably positioned within the bore and movable between the inlet and relief passages to regulate the pressure of the fluid in the outlet passage, the regulator valve having one face thereof exposed to the pressure fluid in the outlet passage so as to urge the regulator valve in a pressure decreasing direction, means urging the regulator valve in a pressure increasing direction; the means comprising a valve element slidable within the bore, a spring interposed between the regulator valve and the valve element, control means including a control chamber communicating both with the inlet passage and the bore so that the pressure of the fluid therein will act upon the valve element and cooperate with the spring to urge the regulator valve in the pressure increasing direction, the control chamber having an exhaust therefrom, a control valve coacting with the exhaust to vary the opening thereof and accordingly the exhaust of fluid from the control chamber so as to alter the fluid pressure in the control chamber, electromagnetic means for operating the control valve, the electromagnetic means including a relay winding so arranged relative to the control valve as to apply an electromagnetic force thereto when energized for causing the control valve to alter the opening of the exhaust, a voltage source for energizing the relay winding, a manual control member for varying the torque demand on the engine and variable impedance means adjustable by the manual control member for varying the amount of voltage applied to the relay winding and accordingly the energization thereof so that the fluid pressure in the control chamber is varied in accordance therewith and thereby causing the regulator valve to develop a regulated fluid pressure reflecting the torque demand on the engine.

References Cited by the Examiner
UNITED STATES PATENTS

| | | | |
|---|---|---|---|
| 1,297,514 | 3/1919 | Turner | 137—495 X |
| 2,031,478 | 2/1936 | Gray | 137—505.11 |
| 2,905,190 | 9/1959 | Oyster. | |
| 2,965,120 | 12/1960 | Snyder | 137—116.3 |
| 2,990,850 | 7/1961 | Cook | 137—540 |

DON A. WAITE, *Primary Examiner.*

M. P. SCHWADRON, *Examiner.*